United States Patent
Razak (10) Patent No.: US 11,492,930 B2
(45) Date of Patent: Nov. 8, 2022

(54) POWER GENERATION SYSTEM WITH CARBON CAPTURE

(71) Applicant: ROLLS-ROYCE PLC, London (GB)

(72) Inventor: Ahmed My Razak, Bristol (GB)

(73) Assignee: ROLLS-ROYCE plc, London (GB)

( * ) Notice: Subject to any disclaimer, the term of this patent is extended or adjusted under 35 U.S.C. 154(b) by 154 days.

(21) Appl. No.: 17/078,805

(22) Filed: Oct. 23, 2020

(65) Prior Publication Data

US 2021/0156281 A1 May 27, 2021

(30) Foreign Application Priority Data

Nov. 22, 2019 (GB) ...................................... 1917011

(51) Int. Cl.
*F01D 25/30* (2006.01)
*F01D 15/10* (2006.01)

(52) U.S. Cl.
CPC ........... *F01D 25/305* (2013.01); *F01D 15/10* (2013.01); *F05D 2270/08* (2013.01)

(58) Field of Classification Search
CPC .......... B01D 2257/504; B01D 2259/65; B01D 53/002; F01D 15/10; F01D 25/305; F01K 23/10; F01K 7/38; F05D 2270/08; Y02C 20/40; Y02E 20/32
See application file for complete search history.

(56) References Cited

U.S. PATENT DOCUMENTS

| | | | | |
|---|---|---|---|---|
| 4,942,734 A | * | 7/1990 | Markbreiter | F25J 1/0236 62/238.3 |
| 2004/0253165 A1 | | 12/2004 | Charron | |
| 2008/0104938 A1 | * | 5/2008 | Finkenrath | F01K 23/10 60/774 |
| 2008/0104958 A1 | * | 5/2008 | Finkenrath | B01D 53/00 60/602 |
| 2010/0126180 A1 | * | 5/2010 | Forsyth | C01B 3/56 62/617 |
| 2010/0279181 A1 | | 11/2010 | Adams, II et al. | |
| 2010/0326084 A1 | * | 12/2010 | Anderson | F01K 23/10 60/750 |
| 2012/0031101 A1 | | 2/2012 | Hoffmann et al. | |

(Continued)

FOREIGN PATENT DOCUMENTS

EP 2647074 B1 8/2014
EP 3204331 A1 8/2017

(Continued)

OTHER PUBLICATIONS

May 21, 2020 Search Report issued in UK Patent Application No. GB1917011.7.

(Continued)

*Primary Examiner* — Jesse S Bogue
(74) *Attorney, Agent, or Firm* — Oliff PLC (57) ABSTRACT

A carbon capture system comprising a gas turbine with a heat exchanger operable to heat a working fluid in the gas turbine, a source of high temperature exhaust gas operable to supply heat to the gas turbine through heat exchanger to heat the working fluid wherein the source of high temperature exhaust gas is operable to provide exhaust gas at a high pressure which is greater than the vapor to liquid transition pressure of $CO_2$ at the temperature of a coolant.

10 Claims, 5 Drawing Sheets

(56) References Cited

U.S. PATENT DOCUMENTS

| | | | |
|---|---|---|---|
| 2013/0145773 A1* | 6/2013 | Kulkarni | ................... F02C 3/34 60/39.5 |
| 2018/0080379 A1 | 3/2018 | Conlon | |
| 2018/0128172 A1 | 5/2018 | Allam | |
| 2018/0291805 A1* | 10/2018 | Allam | ....................... F02C 3/20 |

FOREIGN PATENT DOCUMENTS

| | | |
|---|---|---|
| KR | 102017993 B1 | 9/2019 |
| WO | 2019/165807 A1 | 9/2019 |

OTHER PUBLICATIONS

Apr. 22, 2021 Search Report issued in European Patent Application No. 20206617.1.

* cited by examiner

POWER GENERATION SYSTEM WITH CARBON CAPTURE

CROSS REFERENCE TO RELATED APPLICATIONS

This specification is based upon and claims priority from UK Patent Application No. GB1917011.7 filed on the 22 Nov. 2019, the entire contents of which are incorporated herein by reference.

FIELD OF THE DISCLOSURE

The application relates to carbon capture and storage.

BACKGROUND

Climate change due to greenhouse gas emissions is a well-known issue and is contributed to by the combustion of hydrocarbon fuel producing carbon dioxide (CO2) as a by-product. Although there is an active quest for alternative energy, and indeed renewable energy in the form of wind and solar have played an important part in this quest for alternative energy, hydrocarbons are likely to play an important roles in the foreseeable future.

The current estimate of CO2 by volume in the atmosphere is 0.04%. Many governments have set targets to reduce CO2 emissions to zero. A power plant that can employ hydrocarbon fuels without CO2 emissions will go a long way, in not only reducing Greenhouse Gas (GHG) emissions, but also capture and store the excesses CO2 in the atmosphere to help reduce the atmospheric CO2 to target levels.

Carbon capture processes are known which can recover CO2 from combustion exhausts, but they often require compression of the captured CO2 in order to store and transport it, which consumes a significant portion of the energy produced.

EP3204331 describes an Allam Cycle process where a portion of captured high pressure carbon dioxide is expanded to produce cooling for a second portion of carbon dioxide in order to liquefy it to make it easier to transport and store.

There continues to exist a need for more efficient carbon capture processes. Continuing to use carbon containing fuels, extracting more useful energy from the fuel, while capturing the CO2 products effectively can help to address greenhouse gas emissions.

BRIEF SUMMARY OF THE DISCLOSURE

According to one aspect there is provided a carbon capture system comprising a gas turbine which comprises a heat exchanger operable to heat a working fluid in the gas turbine, a source of hot exhaust gas operable to supply heat to the gas turbine through the heat exchanger to heat the working fluid, wherein the source of high temperature exhaust gas is operable to provide gas at a high pressure, which my be substantially free from nitrogen. The indirect gas turbine is operable to extract heat from the exhaust gas with no significant loss of pressure through the heat exchanger, and to use the heat in the turbine to generate mechanical work, which may for example drive an electrical generator. This allows the exhaust gas to then enter a carbon capture system at high pressure facilitating the removal of carbon dioxide $CO_2$ from the gas by liquefaction.

The exhaust gas may contain less than 5% nitrogen or nitrogen compounds. With a typical combustion processes burning hydrocarbons in air, the exhaust gas would comprise mainly nitrogen and oxides of nitrogen, mixed with water and $CO_2$. In the present invention it is preferable to remove the nitrogen before the reaction that converts the hydrocarbons to water and $CO_2$. As nitrogen compounds may be a source of pollution, reducing emissions of nitrogen compounds provides an additional benefit. In a carbon capture system, removing nitrogen from the exhaust gas also reduces the mass of gas that requires processing.

The carbon capture system may provide a source of coolant, wherein the high pressure of the gas from the source of high temperature exhaust gas is greater than the vapor to liquid transition pressure of CO2 at the temperature of the coolant. By controlling the pressure of the exhaust gas based on the vapor to liquid transition pressure of CO2 at the coolant temperature, a carbon capture process is enabled where liquid water can be easily removed, then carbon dioxide liquified, leaving other components of the exhaust in gaseous form, providing a source of liquid $CO_2$ for easy transport and storage. In such an arrangement the coolant may be water, such as seawater. Other sources of water at a suitable temperature can be selected based on the desired location of the plant.

The carbon capture system may comprise a cooler configured to receive the coolant and cool the high pressure exhaust gas to cause a portion of the carbon dioxide in the exhaust to condense into liquid.

The source of high temperature exhaust gas may be a reactor, in one embodiment the reactor comprises a fuel cell, such as a solid oxide fuel cell. The fuel cell may have a separate reformer, or it may internally reform hydrocarbon fuel.

The reactor may comprise a nitrogen oxygen separator and a combustor which may be supplied with oxygen from the nitrogen oxygen separator. The nitrogen oxygen separator can be used with a combustor as a stand alone oxy-combustor, or it may be used in conjunction with the fuel cell to complete the combustion of any unreacted or partially reacted fuel that exits the fuel cell.

The reactor may be operable to receive fuel and compressed air at the high pressure. A primary compressor may be used to compress air for the reactor, wherein the primary compressor is a turbine which is configured to be driven by a turbine operable to receive unused air from the reactor. The fuel may be supplied at high pressure by a utility company, such as a high pressure natural gas supply, or the fuel may be compressed by a separate compressor.

In another aspect, an electrical generation system is provided comprising a fuel cell, a first gas turbine engine comprising a compressor, a turbine, a shaft and an electric motor, wherein the compressor is arranged to be driven by the turbine and the electric motor, a second gas turbine engine comprising a compressor, a turbine, an electric generator and a heat exchanger operable to supply heat to the second gas turbine engine between the compressor and the turbine, wherein the fuel cell is operable to receive compressed air from the first gas turbine engine, and provide exhaust gas to the heat exchanger of second gas turbine engine and the carbon capture apparatus in series.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Aspects and embodiments of the invention will now be illustrated with the aid of drawings, in which.

DETAILED DESCRIPTION

Figure 1:
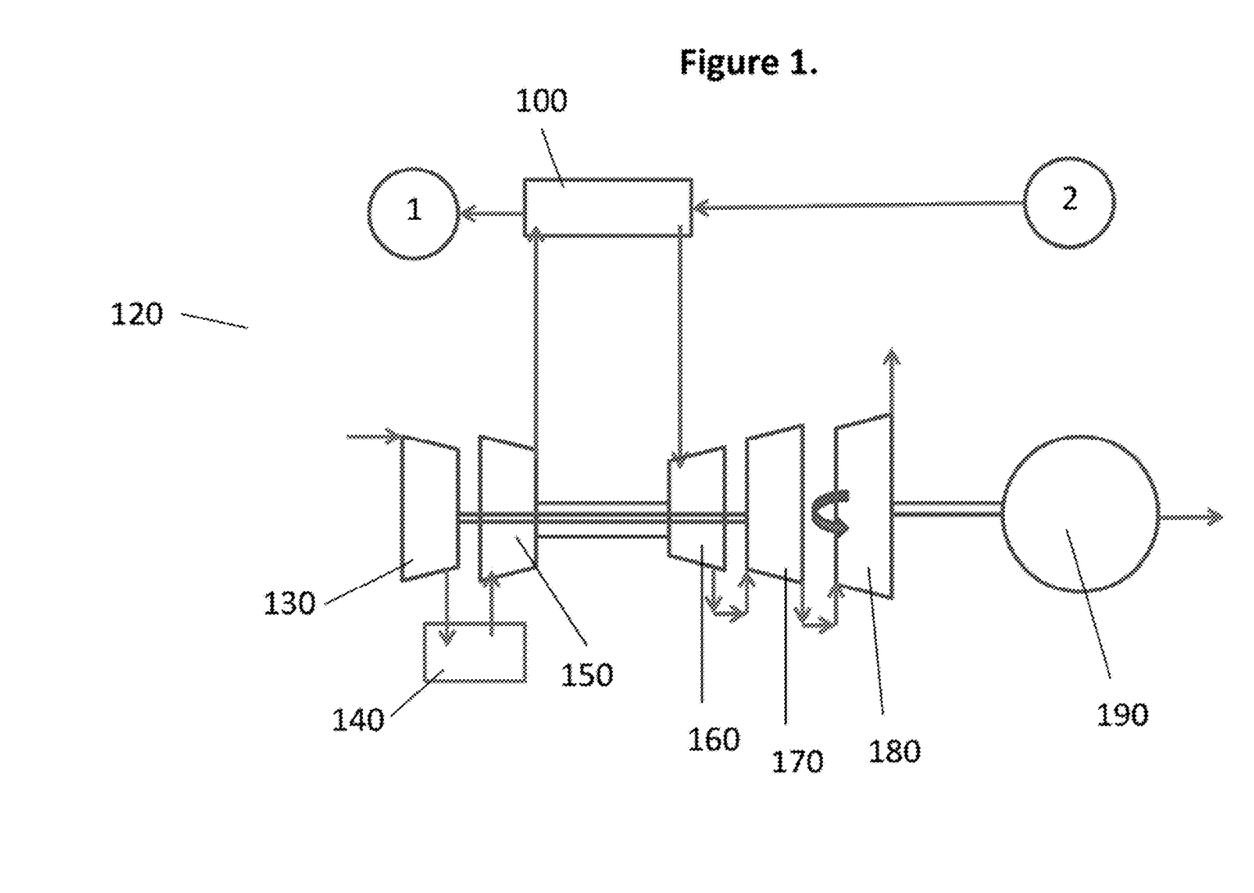
FIG. 1 shows an indirect Brayton cycle turbine.

FIG. 1 shows a Brayton cycle engine, having a heat exchanger, 100, which receives exhaust gases 2, and transfers heat to compressed gas received from compressors 130 and 150. The cooled exhaust gases are then delivered to the system of FIG. 4 for water and CO2 separation as cooled exhaust 1.

Exhaust gases 2 will typically be a mixture of carbon dioxide, gaseous water and may contain other components such as partially burnt or unburnt fuel. The exhaust gases will preferably be substantially free of nitrogen, for example less than 5% nitrogen, less than 4% N, or less than 3% N.

The Brayton air cycle turbine, 120, will typically comprise low pressure compressor, 130, intercooler, 140, high pressure compressor, 150, high pressure turbine, 160, low pressure turbine, 170, and variable nozzle power turbine, 180. This arrangement is one example, and different numbers of compressors and turbines may be used according to the operating conditions required.

As the Brayton cycle turbine receives thermal energy via the heat exchanger 100, the exhaust gases 2 will leave the heat exchanger at approximately the same pressure at which they enter. The exhaust gases may come from any CO2 producing process, advantageously the exhaust gas is received at a high pressure, sufficient to allow CO2 to be liquefied using an available coolant at a later stage in the process. Typically, the exhaust gases will have been produced in a hydrocarbon energy conversion process, such as combustion or a fuel cell.

Turbine driven electrical generator, 190, connected to a turbine shaft, produces power using the heat recovered from the exhaust gas, without any significant reduction in the exhaust gas pressure. This power is in addition to any power or energy extraction provided by the energy conversion process which produced the exhaust gas.

The exhaust gas entering the heat exchanger will preferable have a pressure higher than 40 Bar, and a temperature of for example 891° K. In an example, compressed air from the compressor enters the heat exchanger at a pressure above 3 Bar and a temperature of 300-400° K. With an example flow rate of 0.33 kg/s of exhaust gas and 0.544 kg/s of air in the Brayton cycle turbine, the air leaving the heat exchanger to the turbine can be at a temperature of 845° K, and the Brayton cycle turbine will deliver approximately 66 kw of mechanical power to the electrical generator.

The air cycle turbine described above can be used as a bottoming cycle turbine to convert exhaust heat from a higher process such as the fuel cell described below into mechanical or electric power, or it may be a main turbine receiving energy directly from a combustor as described below.

Figure 2:
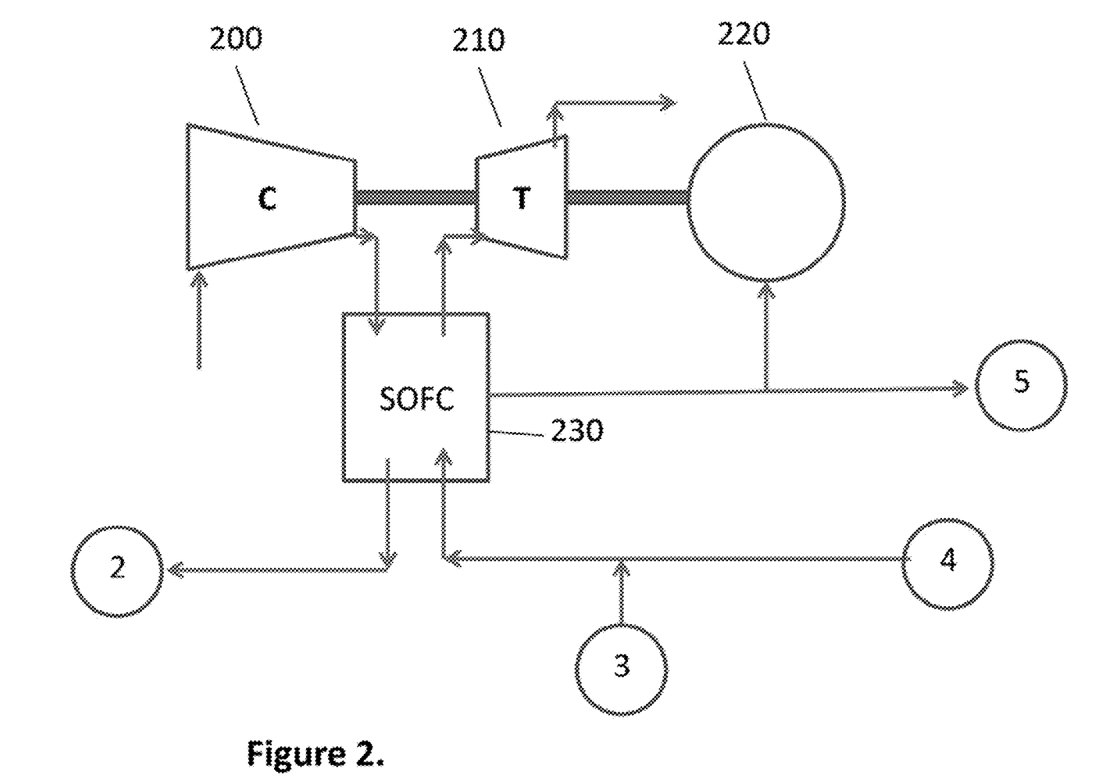
FIG. 2 shows a turbine and compressor arrangement with a fuel cell.

Turning now to FIG. 2, which shows one embodiment of a hydrocarbon energy conversion process that may produce a CO2 containing exhaust gas.

Primary air compressor 200 receives a gas containing oxygen, such as air, and compresses the gas to the high working pressure required. During compression the temperature of the gas will also increase. Any type of compressor may be used, for example centrifugal or axial compressor, and may have one or more stages to reach the working pressure required. The temperature may be around 890° K with a pressure of over 40 Bar as the air leaves the compressor in one example. Depending on the requirements of the other parts of the system, as described herein, other pressures can be achieved by variation of the compressor parameters, e.g. number of stages, RPM. Different temperatures may be required and can be achieved by, for example, providing intercoolers between compressor stages, or heat exchangers after the compressor to add or remove enthalpy. Preferably the pressure and temperature of the air from the compressor are achieved by designing the compressor to match the requirements of the other parts of the system without requiring other components.

The compressed hot oxygen containing gas mixture, e.g. air, passes into fuel cell 230. Fuel cell 230 is preferably a solid oxide fuel cell (SOFC). Carbon based fuel 4, for example a hydrocarbon such as methane, enters the other side of the SOFC. Oxygen will pass through the cathode of the SOFC and combine with the fuel at the anode to produce electric current, and by-products CO2, water and heat. The heat from compression combined with the heat from the chemical reaction helps to maintain the temperature of the SOFC, which is necessary to accelerate the electrochemical process. The SOFC operation is described in more detail below with respect to FIG. 5. Any fuel cell that is capable of reforming hydrocarbon fuel by extracting oxygen from air or other oxidant containing gas mixtures may be used.

Primary turbine 210 receives the hot, high pressure gas from the fuel cell which has been largely depleted of oxygen. The turbine can directly or indirectly drive the compressor 200. Because there is not generally a temperature rise in the air passing through the fuel cell, and the mass flow of gas passing through the turbine is smaller than the mass flow through the compressor, a net input of additional power is required to drive the compressor-turbine system. This is provided, in the example of FIG. 2, by electrical machine 220. Electrical machine 220 may be an electric motor. Motor 220 may be driven by part of the electrical power output from the SOFC, or from another source of power.

Fuel Cell 230 generates electric current 5. The power available as electric current is generally over 50% of the chemical power input from fuel 4. In the example shown, around 8% of this electrical output may be used to assist the turbo-compressor system.

As an example, 1 kg/s of air may enter the compressor to be compressed from STP up to over 890° K and above 40 Bar. In this example, 0.103 kg/s of methane may enter the fuel cell and combine with the oxygen in the air to produce CO2, water and heat. 0.769 kg/s of oxygen depleted air at 39.3 Bar and 891° K enters the turbine.

The fuel cell may generate 2314 kW of electrical power in this example. The electrical machine 220 may use 190 kW of the available power to drive the compression process. The exhaust from the fuel cell in this example will be at a pressure above 40 Bar and a temperature of over 890° K.

In some cases, the fuel cell may not completely react all of the fuel supplied with oxidant. In some cases, such as when the unburnt fuel is methane, the unburnt fuel can be removed as part of the carbon capture process described below. However where other hydrocarbon fuels are used, unburnt portions of the fuel may be difficult to separate from the carbon dioxide and water in the exhaust gas. To reduce the amount of unused or partially reacted fuel in the exhaust gas, the fuel cell may be coupled to a secondary combustor, and/or an electrochemical device to remove unused oxygen from the exhaust gas.

Such an electrochemical device and combustor arrangement is described in granted EP patent EP2647074B1, "A Solid Oxide Fuel Cell System and a Method of Operating a Solid Oxide Fuel Cell System". As described therein at paragraph [0042], the electrochemical device may comprise an electrolyte, an anode and a cathode. Means may be provided to supply a portion of the unused fuel from the anodes of the solid oxide fuel cell(s) to supply the unused fuel to the anode of the electrochemical device and may be arranged to supply a portion of the unused fuel to the cathode of the electrochemical device. The electrochemical device where present, may be arranged to remove oxygen from the unused fuel at the cathode of the electrochemical device. The electrochemical device may be arranged to transfer oxygen through the electrolyte from the unused fuel at the cathode of the electrochemical device to the unused fuel at the anode of the electrochemical device and the electrochemical device and use the oxygen transferred through the electrolyte to oxidise the unused fuel at the anode of the electrochemical device. The electrochemical device may be supplied with electricity in order to remove oxygen from the unused fuel at the cathode of the electrochemical device.

A further supply of oxidant may be supplied to the combustor to react with any remaining unburnt fuel to minimise the presence of unburnt fuel in the exhaust gas.

The fuel cell stack may also be supplied with a reformer to reform the fuel into syngas that is suitable for the fuel cell. While some fuel cells are known and some are in development that can oxidise methane directly or in stages with water to produce electrical energy, other fuels may be used with a separate appropriate reformer.

The invention is not limited to a particular primary turbine compressor or fuel cell type, as long as they are appropriately matched. Multiple fuel cells may be placed in parallel, and multiple compressors and turbines can be arranged to achieve a match between the desired power output from the fuel cell and the required oxygen flow.

Figure 3:
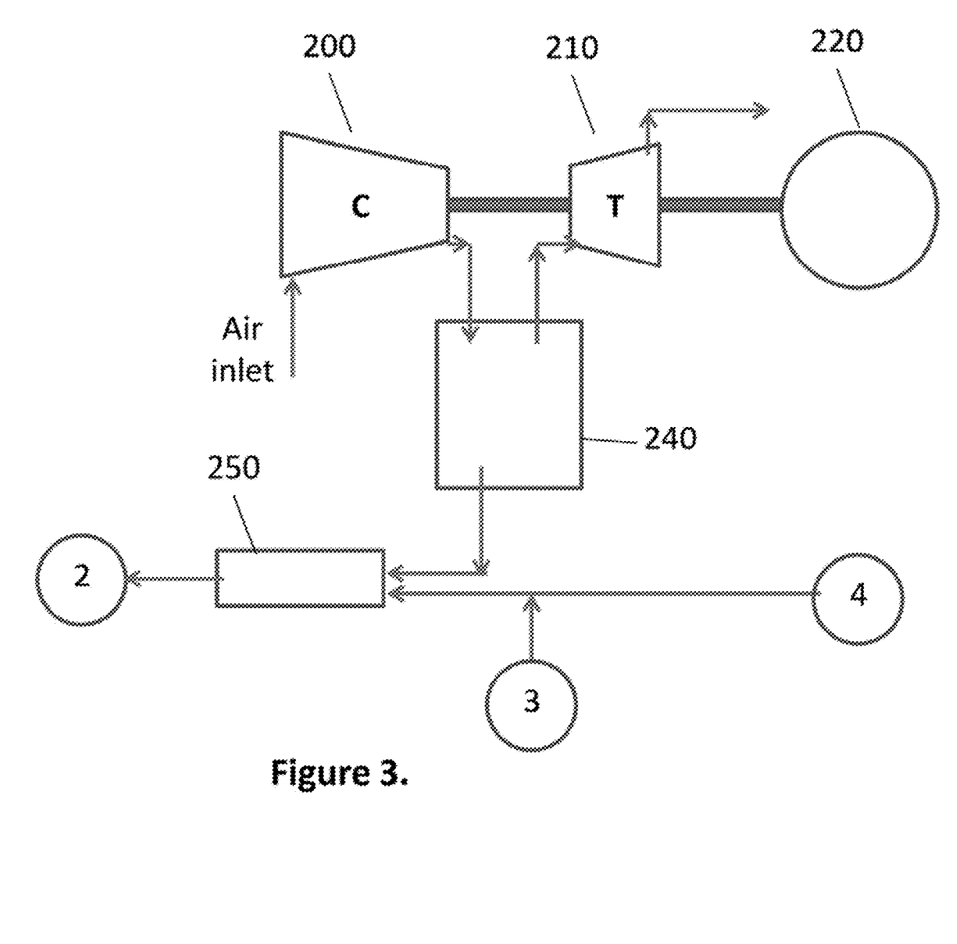
FIG. 3 shows a turbine and compressor arrangement with a nitrogen separator and combustor.

FIG. 3 shows an alternative hydrocarbon energy conversion process that may be used to produce a CO2 containing exhaust gas.

Air compressor 200, turbine, 210, and electrical machine 220 provide similar functions to the same numbered items in the embodiment of FIG. 2.

Instead of a SOFC, nitrogen/oxygen separator 240 receives the hot compressed air from the compressor 200. Carbon based fuel from 4 enters combustor 250 along with the oxygen from the separator 240. the fuel is oxidised in the combustor to produce carbon dioxide and heat.

CO2 and other exhaust gases 2 from the combustor pass out at high pressure to the air cycle described in FIG. 1 to extract energy from the hot gas.

Figure 4:
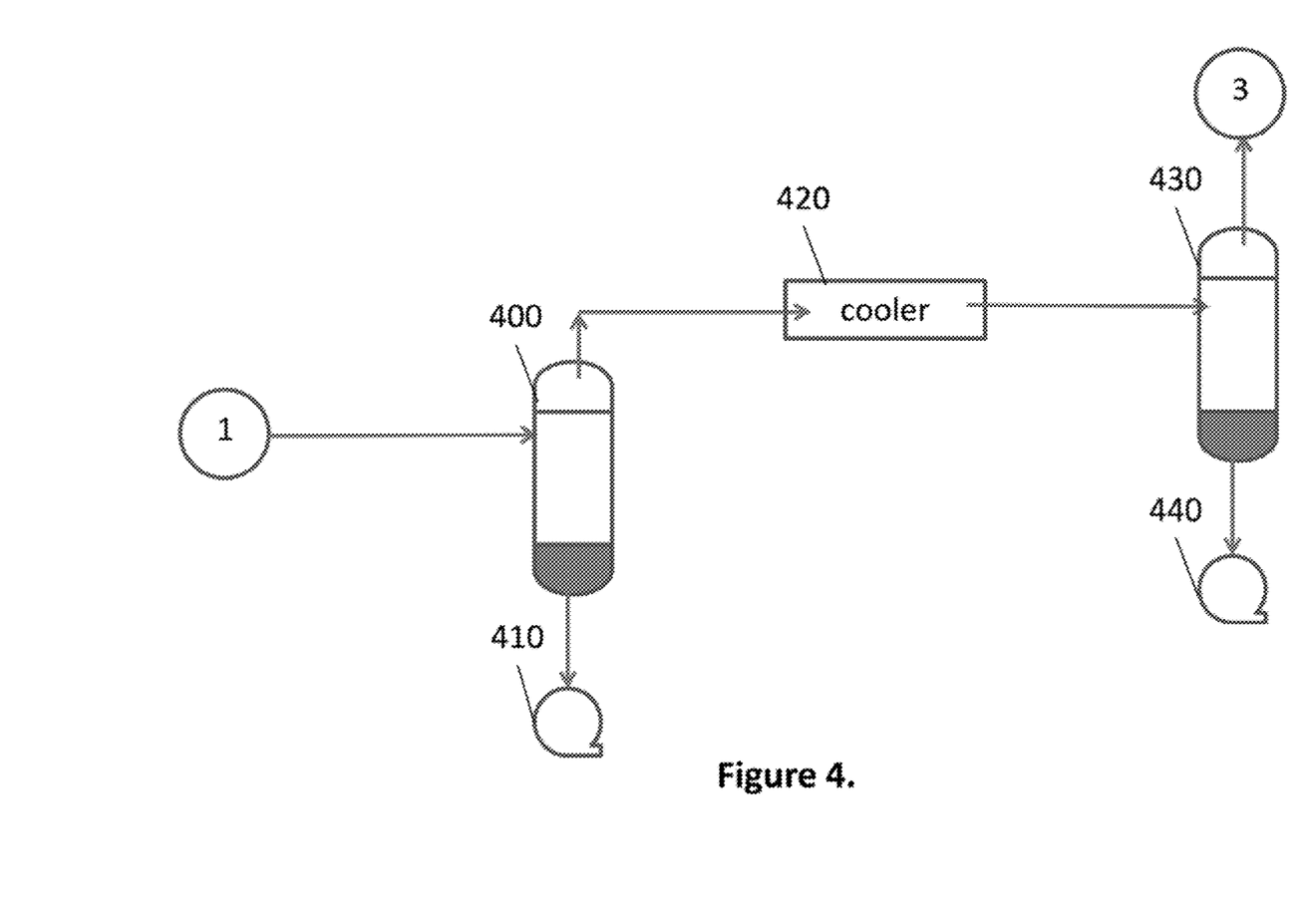
FIG. 4 shows a system for removal of water and $CO_2$.

FIG. 4 shows a CO2 separation system for removing CO2 from exhaust gases.

High pressure exhaust gas 1 comprising CO2 enters the system.

Water separator 400 receives the exhaust gas which will contain liquid phase water at the temperature and pressure of the exhaust gas from the heat exchanger. Water separator 400 may have an additional cooling jacket to reduce the exhaust gas temperature further to increase the water separation. At an example pressure of 40 Bar (4000 kPA), over 95% of water will condense into liquid at a temperature of 100° C. Reducing the exhaust gas temperature to 50° C. in the water separator can increase the water removal to over 99% of the water present in the exhaust. This is advantageously higher than water removal from a conventional combustion exhaust, as the absence of nitrogen means that the partial pressure of water is higher than would otherwise be found and therefore significantly more water can be removed under the high pressure conditions. This advantageously improves the purity of collected CO2 in other parts of the process.

Water collected in water separator 400 is then passed to water disposal 410, which removes the collected water from the system. As the water is stored at 40 Bar or above at this stage, some further energy may be recovered as the water is exhausted.

Cooler 420 receives the exhaust gas which is now depleted of water and further reduces the temperature. The temperature is reduced by the cooler to a point where CO2 will condense into a liquid. As set out below in table 1, the liquid-vapor transition temperature for carbon dioxide varies with pressure. The pressure of the exhaust gas may be controlled in the combustion process or fuel cell by means of the primary compressor circuit, and by also pressurising the fuel supply. Operation of the system to allow the collection of carbon dioxide in a liquid form can be optimised by first identifying a local coolant source, which would preferably be a readily available environmental source, such as river water or sea water. The primary compressor can then be controlled or designed so as to compress the oxygen containing gas at the start of the process to a pressure that provides a condensation temperature of CO2 that is higher than the available coolant temperature. This pressure will mean that the exhaust produces from the combustor or the fuel cell will be at close to the same pressure.

CO2 Separator 430 receives the cooled exhaust gas and encourages the CO2 vapor to condense into liquid form for collection. CO2 Pump 440 may be used to transfer the liquid CO2 at high pressure into storage facility.

The exhaust gas may contain other gases, such as unburnt fuel or other unavoidable contaminants. When the fuel is methane, for example, the methane will remain in gaseous form and can be returned to the fuel cell or combustor as unburnt fuel 3.

The CO2 can then be permanently stored, to reduce carbon dioxide emission from the atmosphere, or it may be used as a feedstock to a chemical process, such as methanol production from hydrogen and CO2.

Aspects as described may provide a hydrocarbon to electricity conversion process which exceeds the efficiency of many conventional cycles, such as a gas turbine. At the same time reducing carbon dioxide emissions to atmosphere and providing a source of liquid CO2 as a chemical feedstock.

As described above, in order to liquefy the CO2, the exhaust gas needs to be at a high working pressure greater than the vapor to liquid transition pressure of CO2 at the temperature of an available coolant. Preferably the coolant is available from an environmental source such as a river, lake or sea. The temperature below which liquids will form at a given pressure may be referred to as a condensation point, dew point, or liquid-gas transition temperature, which may be indicated for example as a line on a pressure-temperature diagram between the triple point and the critical point.

While a coolant can be provided using a refrigeration cycle, this would consume a significant amount of energy. In order to avoid additional energy being used to liquefy the CO2, it would be preferable to provide the gas at a pressure where the CO2 can be condensed into liquid using a readily available source of environmental cooling. Typically, power plants are located adjacent to sources of cooling water, such as rivers or the ocean. This water can be used for cooling CO2 into the liquid phase, which means that the CO2 needs to be collected at pressures higher than 34.85 bar (3485 kPa). For pure $CO_2$ the relationship between pressure and dew point (or condensation point, liquid-gas transition temperature etc.) can be derived from formulae or tables, such as the figures in table 1.

TABLE 1

Liquid-Gas transition temperatures for Carbon Dioxide at various pressures

| Pressure (bar) | $CO_2$ condensation point (required coolant temperature) ° C. |
|---|---|
| 34.85 | 0 (ice) |
| 38.68 | 4 (dense deep ocean water) |
| 45.02 | 10-Northern seas and rivers |
| 57.29 | 20 Typical coastal water |
| 72.14 | 30 Tropical ocean temperature. |
| 73.9 | 31.1 Critical point-No liquid possible |

As can be seen from the table, a CO2 pressure above 45 Bar would allow liquification to be carried out using cooling water extracted from typical seas and rivers in cool climates, such as those found in Northern Europe or Canada. For other, warmer, climates a higher pressure exhaust gas containing $CO_2$ will be required as shown in the table.

In practice the fugacity interactions between $CO_2$ and unavoidable impurities such as other gases in the mixture will affect the boiling point for a typical exhaust gas composition, requiring a higher pressure, or lower temperature. An example exhaust gas composition that might be produced by a hydrocarbon plant is shown below in mole fractions:

$CO_2$ 0.928
Nitrogen 0.0387
CO $1.45*10^{-5}$
Argon 0.00899
Water 0.0242

A pressure of 71 Bar-A and coolant temperature below 14° C. would be suitable liquefy this example $CO_2$ exhaust.

At higher levels of purity (e.g. 97.5%) the CO2 in the exhaust will be a liquid at below 20° C. at a pressure of 71 Bar-A. At such a high level of purity the pressure can fall to about 65 Bar-A if the coolant temperature is about 14° C. With pure CO2 the pressure needs to be about 50 Bar-A with a coolant temperature of about 14° C. for the CO2 to remain as a liquid.

Figure 5:
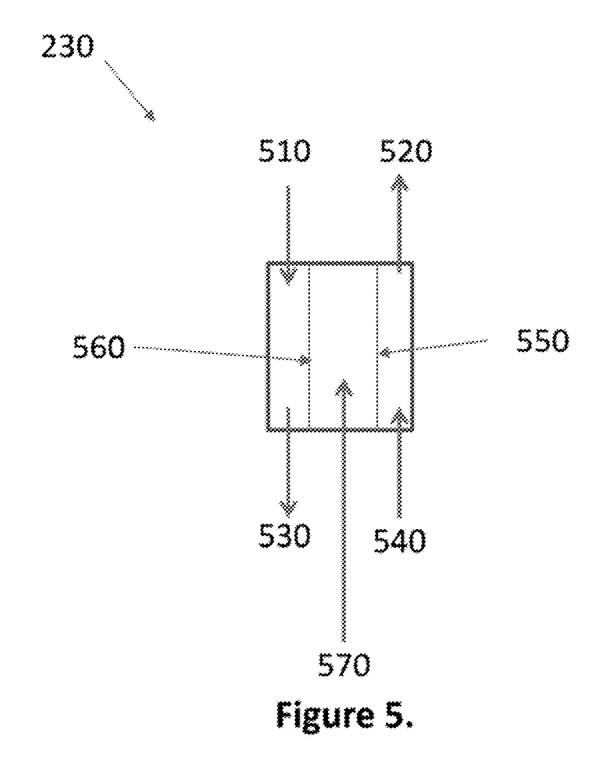
FIG. 5 shows a fuel cell arrangement.

FIG. 5 shows a typical solid oxide fuel cell.

Fuel cell 230 has an air inlet 510 and oxygen depleted air outlet 520, fuel inlet 540 and exhaust outlet 530. Oxygen diffuses through cathode 550, being ionised on the way, releasing electrons to the cathode. Oxygen ions pass through the electrolyte 570 to the anode 560 where they combine with the fuel to produce exhaust gas.

Solid oxide fuel cells operate at very high temperatures, typically between 500 and 1,000° C. Because of these high temperatures, light hydrocarbon fuels, such as methane, propane, and butane can be internally reformed within the anode. SOFC 230 could also be fueled by externally reforming heavier hydrocarbons, such as gasoline, diesel or biofuels. The fuel cell stack may therefore optionally be supplied with a reformer. Solid fuels such as coal and biomass may be gasified by steam reforming or other gasification methods to form syngas which is suitable for fueling the SOFC.

Fuel cells that can utilise hydrocarbon fuels lend themselves well to capture CO2 generated as a by product. One such fuel cell, Solid Oxide Fuel Cells (SOFC) are well established. However, they have high capital cost, which might prevent them from being widely employed. Although their energy conversion efficiencies above 70% are impressive, they generally require high operating temperatures over 500° C. to operate satisfactorily.

Aspects disclosed herein may provide a bottoming air cycle working in conjunction with SOFC to generate electricity efficiently while capturing the produced CO2, thus making such fuel cells competitive with other power generation system, as normally CO2 capture is an expensive addition to a conventional power plant.

Current aero-engine practice can achieve compressor pressure ratios of 60 (i.e. 60 Bar pressure at the outlet when atmospheric air is compressed) where the compressor exit temperature rises to around 800° C. These high temperatures help to enable the solid oxide electrolytes in a SOFC stack to become active, when they will begin to conduct oxygen ions. The airflow from the compressor passes through the SOFC and then enters the turbine having most of the oxygen removed from the air. Compared to a conventional gas turbine with a combustor, this process results in a loss within the compressor turbine path, as the mass flow through the turbine is lower than the compressor, and this loss needs to be provided for to sustain the operation of the compressor and turbine arrangement (turbomachinery), as shown in the embodiment of FIG. 2. This may be achieved by partially powering the turbomachinery using an electrical machine such that the compressor exit temperature is at the temperature required by the SOFC. The electrical power required by the motor is preferably taken from the SOFC electrical output and the remaining power output is available for export. This situation is very similar to a single shaft gas turbine where part of the total turbine power output is used to drive the compressor while the remaining turbine power output is available to drive a load (e.g. an electric generator).

The high temperature air entering the SOFC enables oxygen ions to flow from the cathode to the anode via the solid oxide electrolyte where it meets the fuel and oxidises the fuel to CO2 and water while generating electrical power. There will also be some unused fuel at the anode but no other gases pass through from the air side. Therefore fuel cells, such as SOFC, effectively separate out the CO2 for easy removal, and the removal of water and unused fuels are also easily removed as explained herein and shown in FIG. 4.

The removal of CO2 is enabled due to the high working pressures of the SOFC, which is sufficient to liquefy the CO2 when it is cooled down to storage temperatures. For example, the CO2 storage temperature may be no higher than 20° C. which can be achieved when the CO2 is stored in large tanks in the sea where the sea water temperature does not exceed 20° C. This eliminates the need for refrigeration.

The above process is illustrated in FIGS. 1, 2 and 4. As described above, the high temperature and pressure primary compressor exit air enters the SOFC where the oxygen ions flow through the electrolyte from the cathode and meets the fuel at the anode. The oxidation of the fuel at the anode generates electricity while concentrating the by-products, or exhaust gases, such as CO2, water and unused fuel for easy removal.

These high temperature and pressure by-products 2 are cooled via a heat exchanger (100), which is a heat source for an Air Bottoming Cycle (ABC), thus producing additional power output. Although the main power output is from the fuel cells, such an ABC cycle arrangement may produce 10% of the fuel cells power output and can therefore satisfy much of the loss in the turbomachinery described above.

The by-products (1) leaving the HX will be in two phases because the water cannot gasify at such high pressures. Therefore the liquid water is removed in a separator, 400, which will fall to the bottom of the separator and be pumped out while the gaseous products, namely CO2 and unused fuel, will flow out of the separator, as shown in FIG. 4. The water may be flashed to produce steam, which can be expanded in turbines to generate additional electrical power.

These gaseous by products are then passed through a sea water cooler, which will liquefy the CO2 because of the high pressure and low sea water temperature. The mixture flows through a second separator where the liquid CO2 is removed by a pump and the unused fuel flows out of the separator. The liquid CO2 can be pumped to higher pressure for storage if required. The unused fuel is returned to the fuel line for reuse by the fuel cells. By such means fuel slippage is avoided, which can be an issue if the fuel is methane (natural gas), as methane is also a very potent greenhouse gas.

| List of drawing references | |
| --- | --- |
| FIG. 1: | FIG. 2 |
| 100 Heat Exchanger | 200 Air compressor |
| 2 Source of pressurised carbon dioxide | 210 Nitrogen turbine |
| 120 Air cycle turbine | 220 Electrical machine |
| 130 Low pressure compressor | 230 Fuel Cell |
| 140 Intercooler | FIG. 3 |
| 150 High pressure compressor | 200 Air compressor |
| 160 High pressure turbine | 210 Nitrogen turbine |
| 170 Low pressure turbine | 220 Electrical machine |
| 180 Variable nozzle power turbine | 240 Nitrogen separator |
| 190 Turbine driven electrical generator | 250 Combustor |
| FIG. 4 | FIG. 5 |
| 400 Water separator | 230 Fuel Cell |
| 410 Water disposal | 510 Fuel Cell air in |
| 420 Cooler | 520 Air out |
| 430 $CO_2$ Separator | 530 Exhaust |
| 440 $CO_2$ Pump | 540 Fuel in |
| General | 550 Cathode |
| 1 Cooled high pressure exhaust gas | 560 Anode |
| 2 Hot high pressure exhaust gas | 570 Electrolyte |
| 3 Recycled fuel | |
| 4 Fuel | |
| 5 Electricity output. | |

The invention claimed is:

1. A carbon capture system comprising:
    a source of coolant, operable to supply a coolant at a coolant temperature below 31° Celcius;
    a primary compressor to provide compressed air at a high pressure which is greater than the vapor to liquid transition pressure of $CO_2$ at the coolant temperature;
    a reactor to receive the compressed air and a carbon based fuel to produce a high temperature exhaust gas comprising carbon dioxide;
    a heat exchanger operable to remove heat from the high temperature exhaust gas; and
    a cooler configured to receive the coolant and cool the high pressure exhaust gas to cause a portion of the carbon dioxide in the exhaust to condense into liquid.

2. The carbon capture system of claim 1, wherein the reactor is operable to extract the oxygen from the compressed air to react with the carbon based fuel, and reject the other gases present in air via another stream, so as to supply exhaust gas which contains less than 5% nitrogen.

3. The carbon capture system of claim 1, where the coolant is water.

4. The carbon capture system of claim 1, wherein the reactor comprises a fuel cell.

5. The carbon capture system of claim 1, wherein the reactor comprises a nitrogen oxygen separator configured to supply oxygen to a combustor.

6. The carbon capture system of claim 1, wherein the reactor is operable to receive both fuel and compressed air at a pressure at or above the high pressure.

7. The carbon capture system of claim 1, wherein the primary compressor is configured to be driven by a turbine that is configured to receive a portion of the compressed air from the reactor.

8. The carbon capture system of claim 7, wherein the primary compressor is configured to be driven by an electric motor as well as the turbine.

9. The carbon capture system of claim 1, further comprising a gas turbine engine which comprises a compressor; a turbine and an electric generator, and the heat exchanger is configured to supply heat to the gas turbine engine between the compressor and the turbine.

10. A method of capturing carbon dioxide from an energy generation process, the method comprising:
    supplying a coolant at a coolant temperature below 31° Celcius, compressing air to a high pressure which is greater than the vapor to liquid transition pressure of $CO_2$ at the coolant temperature;
    supplying the compressed air to a reactor which extracts the oxygen from the air and reacts it with a carbon containing fuel to produce a hot exhaust;
    using the remaining nitrogen from the air to drive a turbine;
    extracting the heat from the hot exhaust using a heat exchanger;
    removing liquid water from the exhaust; and
    cooling the exhaust using the coolant so as to condense carbon dioxide from the exhaust.

* * * * *